United States Patent
Takeuchi et al.

(10) Patent No.: US 7,123,273 B2
(45) Date of Patent: Oct. 17, 2006

(54) OVERLAY OF PLURAL IMAGES

(75) Inventors: Kesatoshi Takeuchi, Shioziri (JP); Kazuyoshi Nakamura, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

(21) Appl. No.: 09/801,913

(22) Filed: Mar. 9, 2001

(65) Prior Publication Data

US 2001/0035870 A1    Nov. 1, 2001

(30) Foreign Application Priority Data

Mar. 10, 2000   (JP)   ............................ 2000-066262

(51) Int. Cl.
  *G09G 5/00*   (2006.01)
(52) U.S. Cl. .................. 345/629; 345/660; 345/604
(58) Field of Classification Search ............... 345/3.1, 345/5, 629, 501, 530, 604; 348/584
See application file for complete search history.

(56) References Cited

U.S. PATENT DOCUMENTS

| | | | | |
|---|---|---|---|---|
| 5,828,421 A * | 10/1998 | Boyce et al. | ............... | 348/565 |
| 5,838,336 A * | 11/1998 | Ross | ............... | 345/536 |
| 5,877,741 A * | 3/1999 | Chee et al. | ............... | 345/629 |
| 5,883,610 A * | 3/1999 | Jeon | ............... | 345/629 |
| 5,912,710 A * | 6/1999 | Fujimoto | ............... | 348/445 |
| 6,157,415 A * | 12/2000 | Glen | ............... | 348/599 |
| 6,177,946 B1 * | 1/2001 | Sinclair et al. | ............... | 345/501 |
| 6,208,354 B1 * | 3/2001 | Porter | ............... | 345/634 |
| 6,268,847 B1 * | 7/2001 | Glen | ............... | 345/604 |
| 6,333,750 B1 * | 12/2001 | Odryna et al. | ............... | 345/629 |
| 6,335,761 B1 * | 1/2002 | Glen et al. | ............... | 348/557 |
| 6,356,313 B1 * | 3/2002 | Champion et al. | ............... | 348/558 |
| 6,462,786 B1 * | 10/2002 | Glen et al. | ............... | 348/599 |
| 6,473,088 B1 * | 10/2002 | Matsumoto et al. | ............... | 345/530 |
| 6,518,970 B1 * | 2/2003 | Glen et al. | ............... | 345/501 |

FOREIGN PATENT DOCUMENTS

| | | |
|---|---|---|
| JP | 61-275792 | 12/1986 |
| JP | 11-024641 | 1/1999 |

* cited by examiner

*Primary Examiner*—Kee M. Tung
*Assistant Examiner*—Jin-Cheng Wang
(74) *Attorney, Agent, or Firm*—Oblon, Spivak, McClelland, Maier & Neustadt, P.C.

(57) ABSTRACT

The overlay image processing device comprises: an image selector for selecting from among an m number of image signals one reference image signal and (n–1) number of superimposing image signals, where m is an integer greater than 2; a resolution converter for converting resolutions of the n number of selected image signals including the reference image signal and the (n–1) number of superimposing image signals into respective desired resolutions; and an image synthesizer for superimposing the (n–1) number of converted superimposing image signals on the converted reference signal.

27 Claims, 13 Drawing Sheets

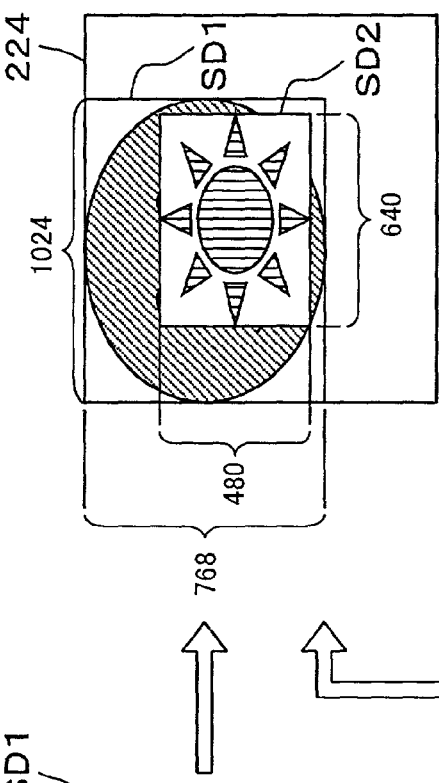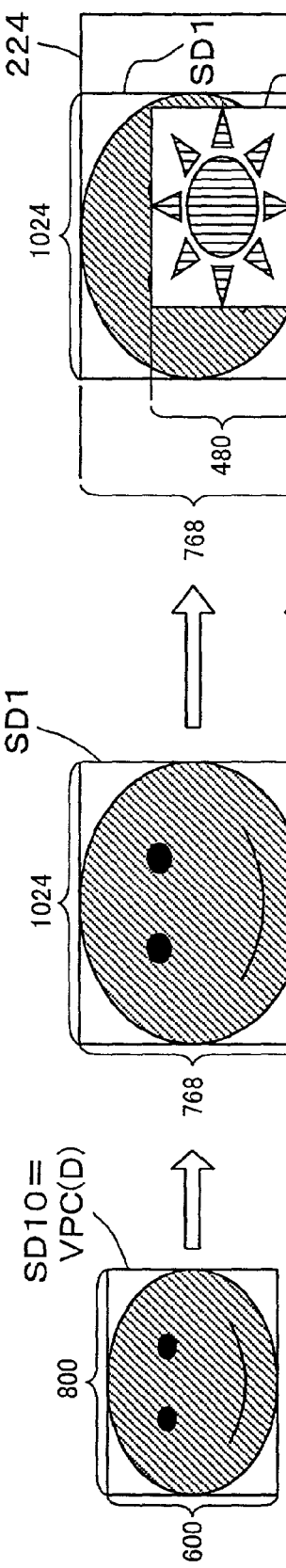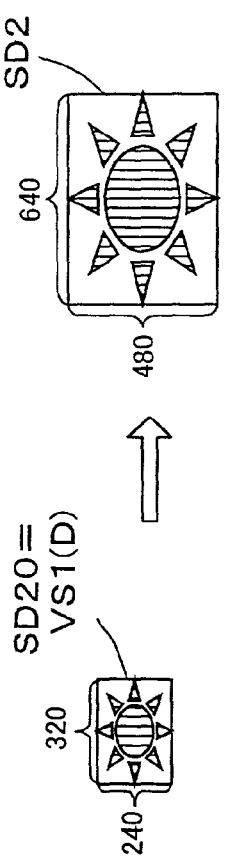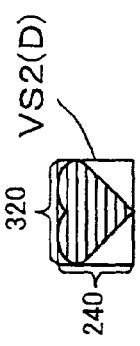

SD1:VPC, SD2:VS1

SD1:VPC, SD2:VS2

SD1:VS1, SD2:VS2

SD1:VS1, SD2:VPC

SD1:VS2, SD2:VS1

SD1:VS2, SD2:VPC

SD1:VPC, SD2:VS1
SD3:VS2

SD1:VPC, SD2:VS2
SD3:VS1

SD1:VS1, SD2:VS2
SD3:VPC

SD1:VS1, SD2:VPC
SD3:VS2

SD1:VS2, SD2:VS1
SD3:VPC

SD1:VS2, SD2:VPC
SD3:VS1

OVERLAY OF PLURAL IMAGES

BACKGROUND OF THE INVENTION

1. Field of the Invention

The present invention relates to overlay of a plurality of images.

2. Description of the Related Art

Certain projectors and other such image display devices are capable of simultaneously displaying image signals from a number of different types of image providing devices. Such devices are capable of simultaneously displaying, for example, images played back by a video tape recorder or images taken with a video camera, superimposed over a graphic image generated by a personal computer. The superimposition of other images ("superimposed images" hereinafter) over a single image ("reference image" hereinafter) is termed "overlay." Hereinafter, images displayed in overlay mode are termed "overlay images."

Conventional image display devices include devices that arbitrarily select an order of superimposition of a plurality of superimposed images ("superimposition order" hereinafter), but none of the existing devices is able to arbitrarily select the reference image as well.

SUMMARY OF THE INVENTION

Accordingly, an object of the present invention is to provide a technology whereby a reference image used in generation of an overlay image may be arbitrarily selected.

In order to attain at least part of the above and related objects of the present invention, there is provided an overlay image processing device for generating an overlay image signal composed of an n number of superimposed image signals, where n is an integer greater than 1. The overlay image processing device comprises: an image selector configured to select from among an m number of image signals one reference image signal and (n−1) number of superimposing image signals, where m is an integer greater than 2; a resolution converter configured to convert resolutions of the n number of selected image signals including the reference image signal and the (n−1) number of superimposing image signals into respective desired resolutions; and an image synthesizer configured to superimpose the (n−1) number of converted superimposing image signals on the converted reference signal.

In a preferred embodiment, the image synthesizer has the n number of 2-input image synthesizers, where each 2-input image synthesizer is configured to receives upper-side and lower-side image signals and superimpose the upper-side image signal on the lower-side image signal. The n number of 2-input image synthesizers are connected in series in multistage fashion such that the 2-input image synthesizer of a first stage uses the reference image signal as the lower-side image signal and a first superimposing image signal as the upper-side image signal, while the 2-input image synthesizer of $i^{th}$ stage, where i is between 2 and n, inclusive, uses an output of the 2-input image synthesizer of $(i-1)^{th}$ stage as the lower-side image signal and $i^{th}$ superimposing image signal as the upper-side image signal.

These and other objects, features, aspects, and advantages of the present invention will become more apparent from the following detailed description of the preferred embodiments with the accompanying drawings.

BRIEF DESCRIPTION OF THE DRAWINGS

FIGS. 7(A)–7(F) show image data written to memory 224 of OVL processor 130.

DESCRIPTION OF THE PREFERRED EMBODIMENT

A. First Embodiment

A1. Arrangement of Image Display Device

Figure 1:
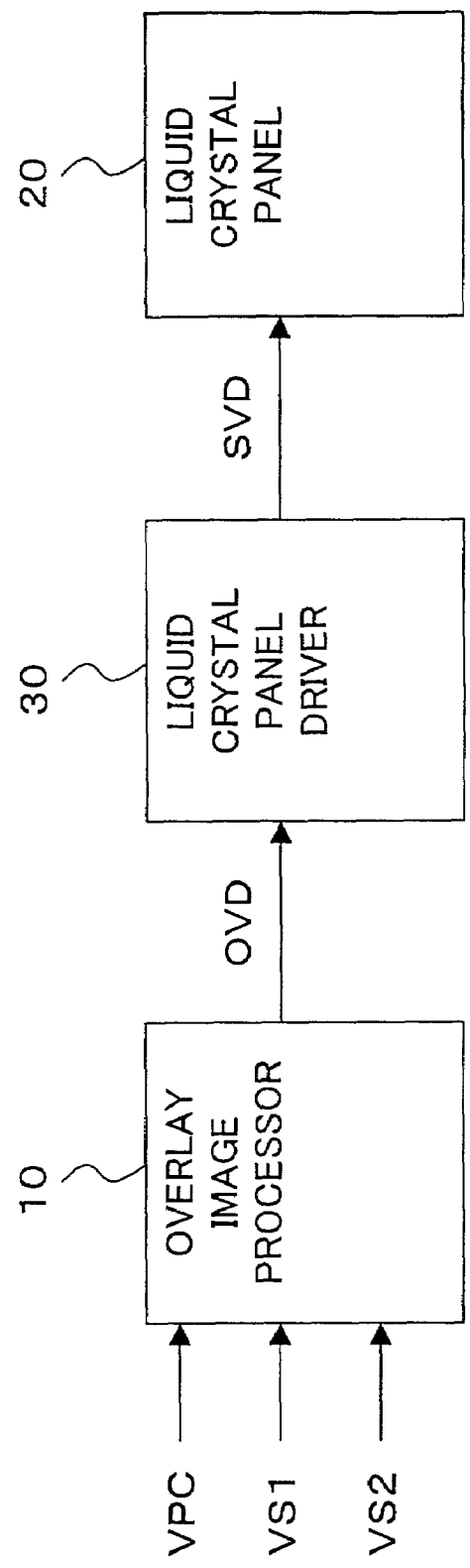
FIG. 1 is a block diagram of an image display device pertaining to a first embodiment.

FIG. 1 is a block diagram of an image display device pertaining to a first embodiment of the invention. The image display device includes an overlay image processor 10, a liquid crystal panel 20, and a liquid crystal panel driver 30. The liquid crystal panel driver 30 may be constructed in the overlay image processor 10.

An overlay image signal OVD output by the overlay image processor 10 is supplied to the liquid crystal panel driver 30. On the basis of the overlay image signal OVD, the liquid crystal panel driver 30 then generates a drive signal SVD for driving the liquid crystal panel 20, and supplies the signal SVD to the liquid crystal panel 20. In the liquid crystal panel 20 illumination from a lighting device (not shown) is modulated in accordance with the drive signal SVD to display an overlay image corresponding to the overlay image signal OVD. The user can observe the resultant overlay image by direct viewing of the liquid crystal panel 20.

A projection optical system for projecting images displayed on liquid crystal panel 20 may also be provided for a projector arrangement. In this case, images displayed on liquid crystal panel 20 are projected onto a projection screen.

A2. Arrangement of Overlay Image Processing Device

Figure 2:
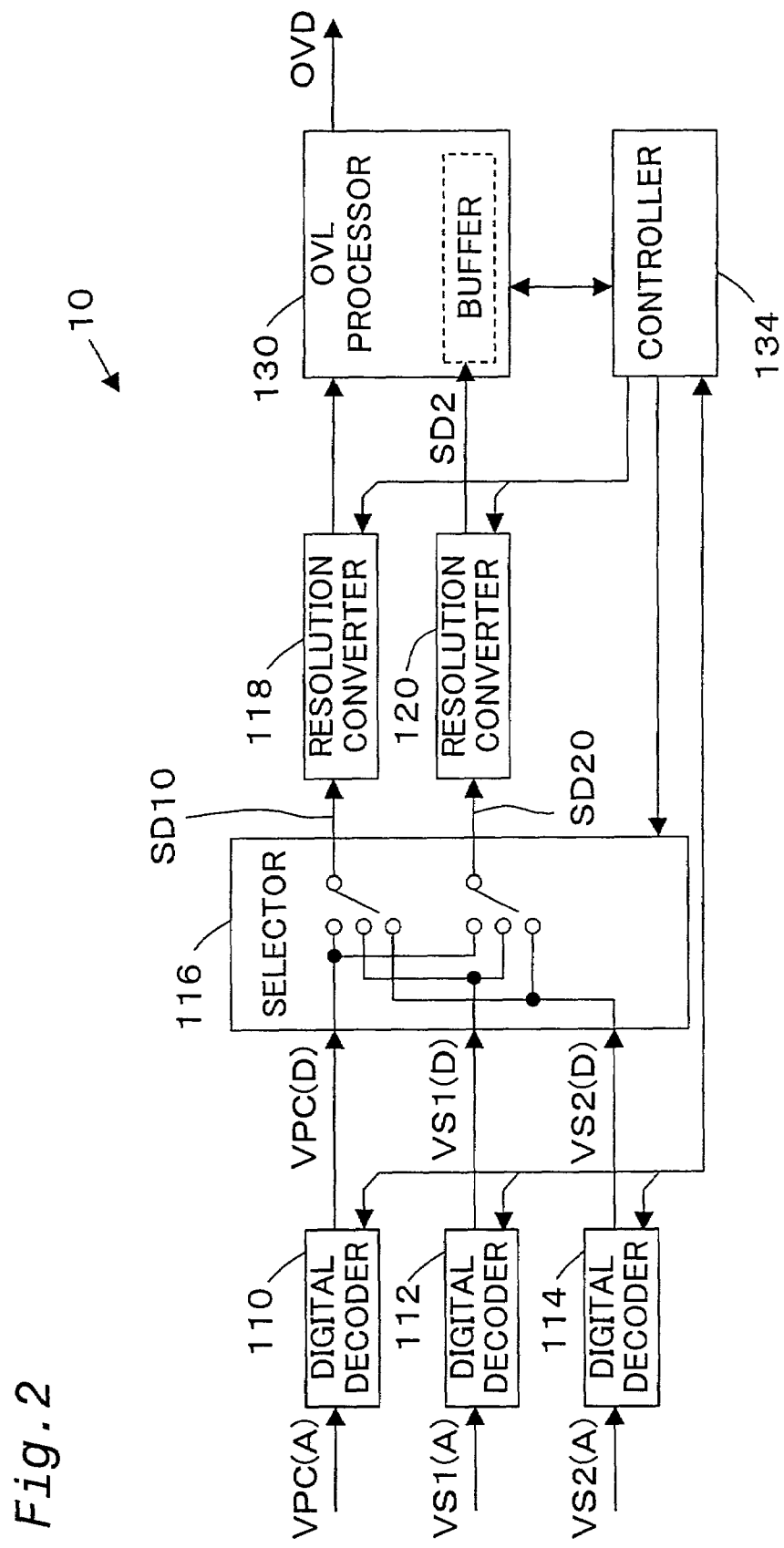
FIG. 2 is a block diagram showing the internal structure of an overlay image processor 10.

FIG. 2 is a block diagram showing the internal structure of the overlay image processor 10. The overlay image processor 10 includes three digital decoders 110, 112, 114, a selector 116, two resolution converters 118, 120, an overlay processor (OVL) 130, and a controller 134. Each block operates under commands from the controller 134.

The first digital decoder 110 is supplied with input image signals VPC(A), or computer display signals, from a personal computer. The first digital decoder 110 converts the analog computer display signals VPC(A) into digital computer signals VPC(D).

Figure 3:
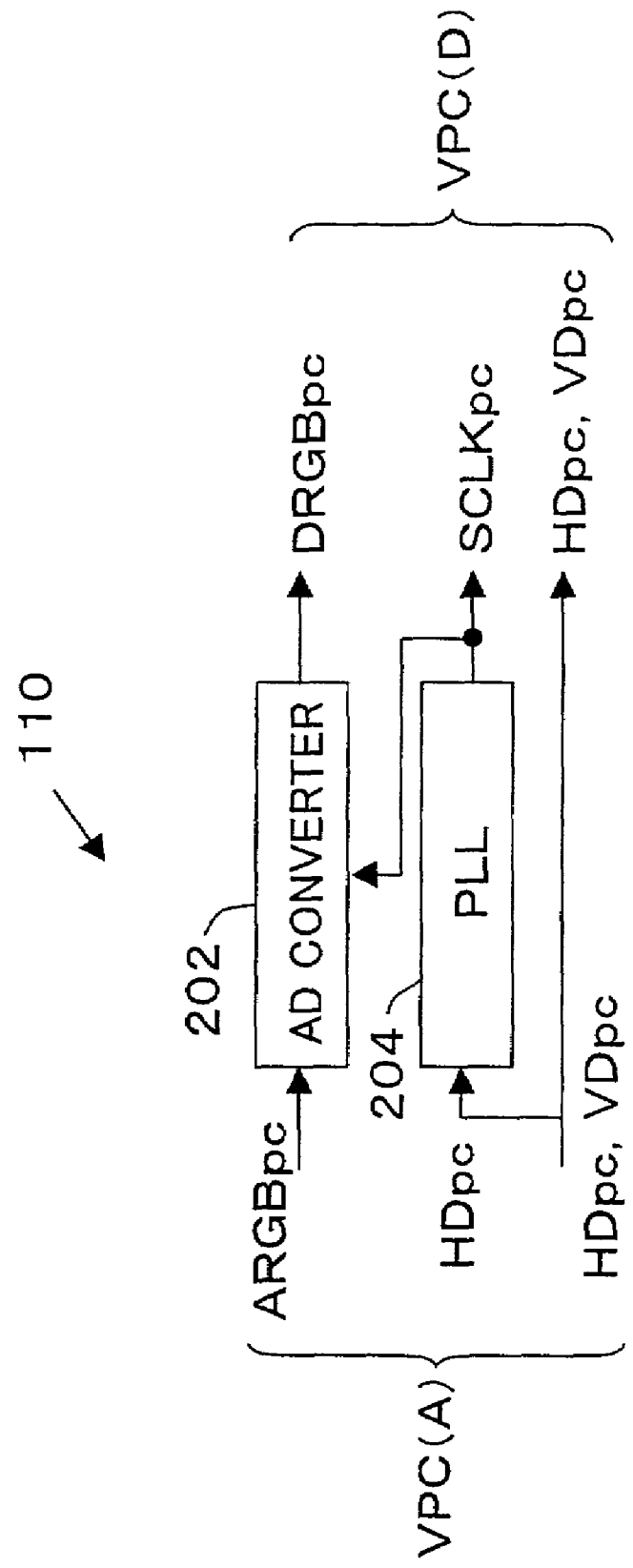
FIG. 3 is a block diagram showing the internal structure of a first digital decoder 110.

FIG. 3 is a block diagram showing the internal structure of the first digital decoder 110. The first digital decoder 110 includes an AD converter 202 and a PLL circuit 204. The computer display signal VPC(A) contains an analog image signal ARGBpc, or RGB signals, and two sync signals including a horizontal sync signal HDpc and a vertical sync signal VDpc. The RGB signal ARGBpc has three color signals indicating brightness for red (R), green (G), and blue (B). PLL circuit 204 generates a clock signal SCLKpc synchronized with the horizontal sync signal HDpc. AD converter 202 quantizes the analog RGB signal ARGBpc with reference to the clock signal SCLKpc to convert it to a digital RGB signal DRGBpc. The clock signal SCLKpc corresponds to an image clock signal indicating the pixel frequency of the RGB signal DRGBpc.

In the preceding manner, the first digital decoder 110 converts the analog computer signal VPC(A) into the digital computer signal VPC(D). The digital computer signal VPC(D) contains the digital RGB signal DRGBpc, horizontal sync signal HDpc, vertical sync signal VDpc, and clock signal SCLKpc.

The second and third digital decoders 112, 114 shown in FIG. 2 are supplied with inputs image signals VS1(A), VS2(A), or television signals, from a video tape recorder, video camera, or the like. The second and third digital decoders 112, 114 convert the analog television signals VS1(A), VS2(A) into digital television signals VS1(D), VS2(D). The television signals may be constructed as various types of signals such as a composite signal, and luminance/chrominance component signals. The example depicted in FIG. 2 pertains to two composite television signals VS1(A), VS2(A).

Figure 4:
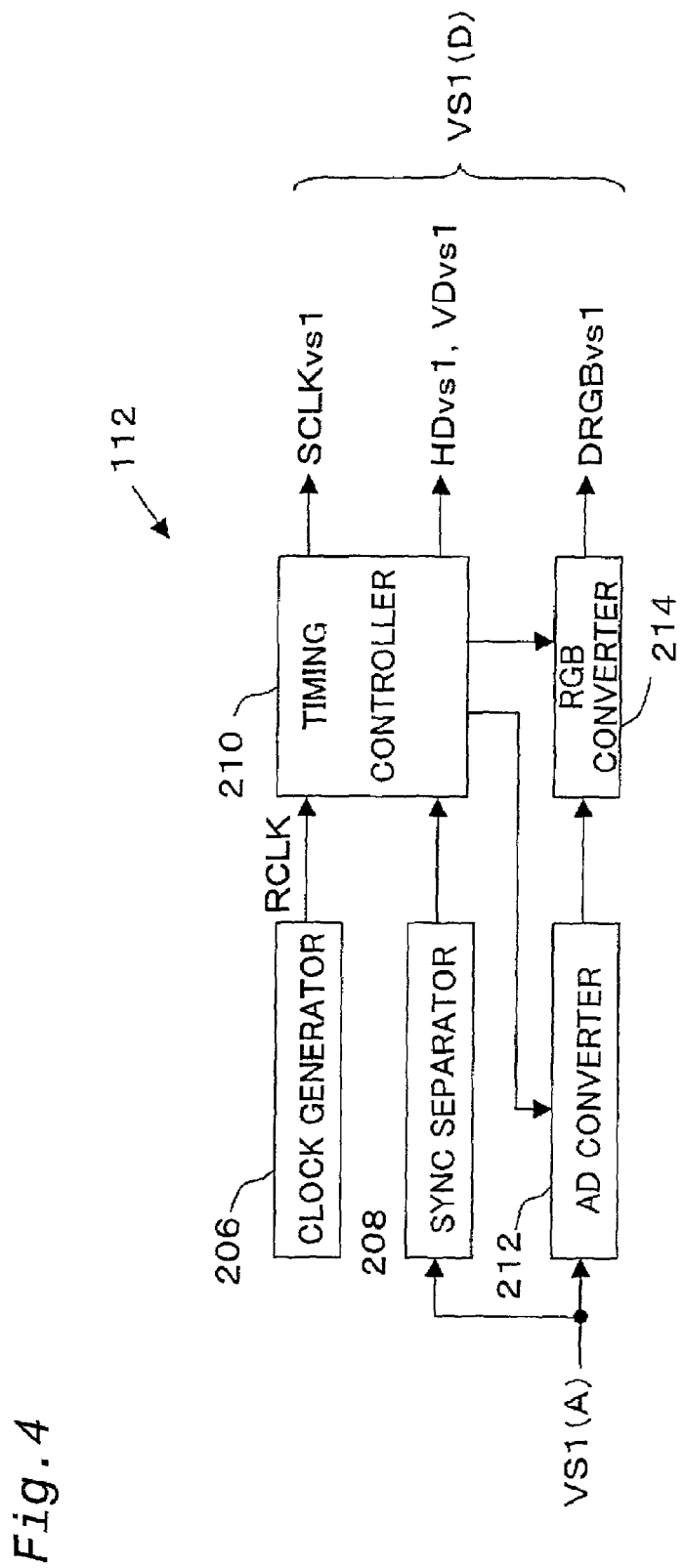
FIG. 4 is a block diagram showing the internal structure of a second digital decoder 112.

FIG. 4 is a block diagram showing the internal structure of the second digital decoder 112. The second digital decoder 112 includes a clock generator 206, a sync separator 208, a timing controller 210, an AD converter 212, and an RGB converter 214. The clock generator 206 generates a clock signal RCLK which is used as a reference timing signal for converting an analog television signal VS1(A) into a digital television signal VS1(D). The sync separator 208 separates horizontal sync signal HDvs1 and vertical sync signal VDvs1 from the television signal VS1(A). The timing controller 210 controls the AD converter 212 and RGB converter 214 on the basis of the clock signal RCLK, horizontal sync signal HDvs1, and vertical sync signal VDvs1. The AD converter 212 quantizes the analog television signal VS1(A) in synchronism with the clock signal SCLKvs1 supplied from the timing controller 210. The RGB converter 214 converts the digital composite signal quantized by the AD converter 212 into a digital RGB signal DRGBvs1. In the preceding manner, the second digital decoder 112 converts the analog television signals VS1(A) into digital television signals VS1(D). The digital television signal VS1(D) contains a digital RGB signal DRGBvs1, horizontal sync signal HDvs1, vertical sync signal VDvs1, and clock signal SCLKvs1.

Commercially available digital video decoder circuits may be used for the second digital decoder 112. For example, the SAA7114 of Philips may be used.

In the preceding example, the analog television signals VS1(A), VS2(A) are analog composite signals. However, where the signals are of another type (e.g., luminance/chrominance component signal), the system may be adapted easily thereto by using a suitable video decoder.

The third digital decoder 114 is analogous to the second digital decoder 112, and does not require further description.

The selector 116 shown in FIG. 2 selects two image signals from among the three original digitized image signals VPC(D), VS1(D), and CS2(D), according to user's instruction. One of the two selected original image signals is designated as a reference original image signal SD10, or background image signal, and the other as a superimposing original image signal SD20. That is, the selector 116 corresponds to the image selector of the present invention.

The first resolution converter 118 (FIG. 2) converts the resolution of the reference original image signal SD10 to produce a reference image signal SD1, and the second resolution converter 120 converts the resolution of the superimposing original image signal SD20 to produce a superimposing image signal SD2. That is, the first and second resolution converters 118, 120 correspond to the resolution converter of the present invention.

Figure 5:
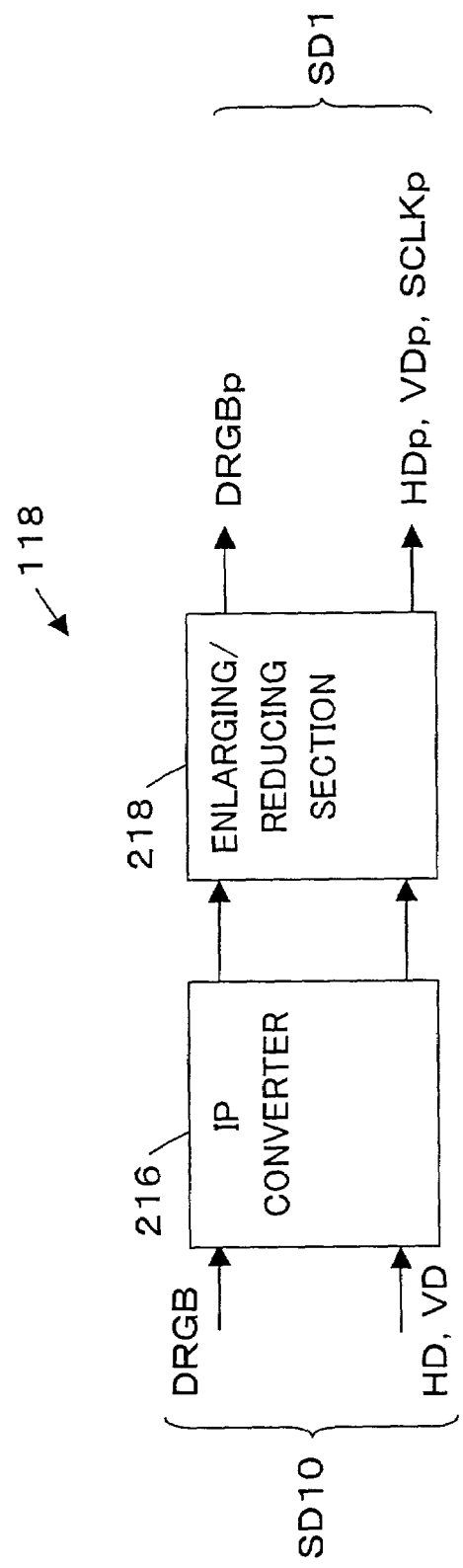
FIG. 5 shows a block diagram showing a simplified arrangement of first resolution converter 118.

FIG. 5 is a block diagram showing the internal structure of the first resolution converter 118. The first resolution converter 118 includes an IP converter 216 and an enlarging/reducing section 218. The IP converter 216 converts interlaced input reference image signals SD10 into noninterlaced (progressive) image signals, and corresponds to the scan converter of the present invention. The enlarging/reducing section 218 converts the image resolution by enlarging or reducing the input image signal. Various ordinary circuits may be employed as the IP converter 216 and enlarging/reducing section 218. The function of the two resolution converters 118, 120 is discussed later.

Figure 6:
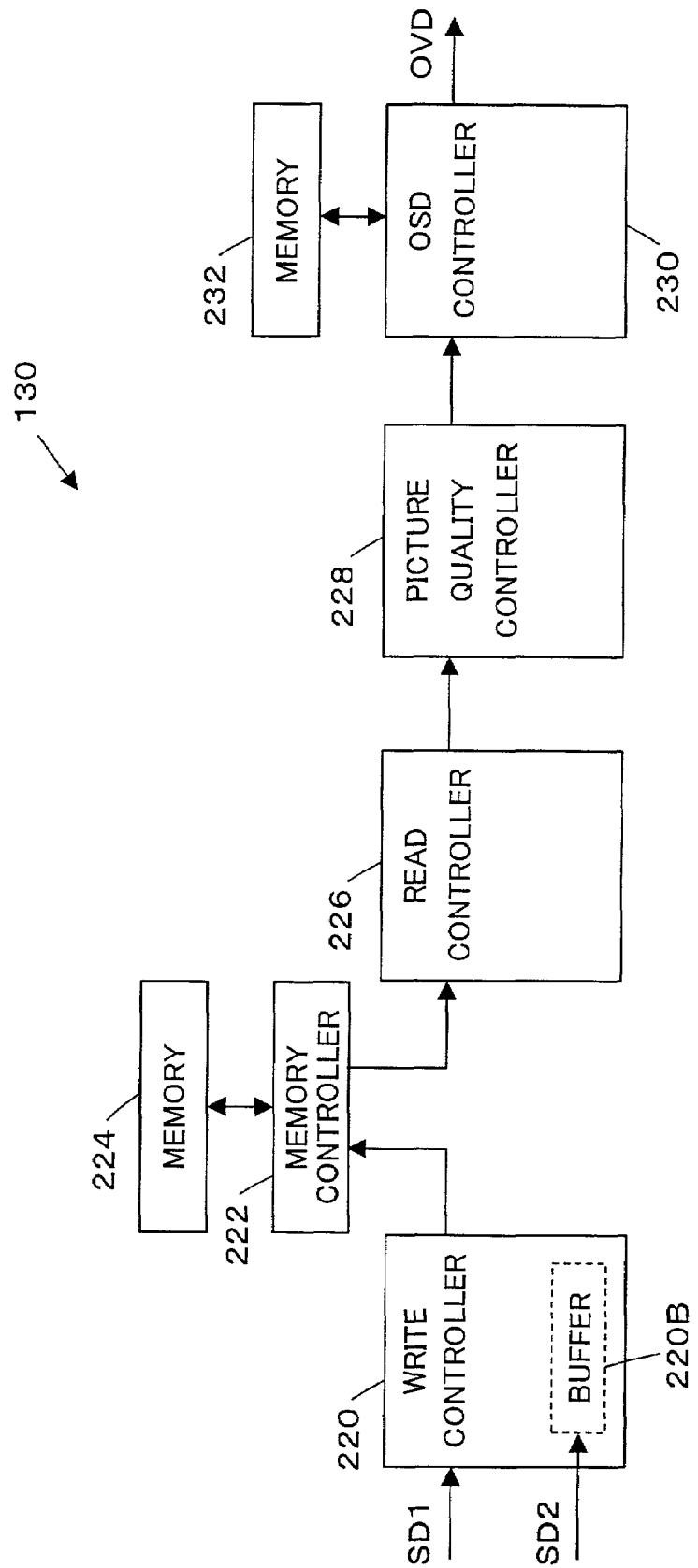
FIG. 6 is a block diagram showing the internal structure of OVL processor 130.

The OVL processor 130 shown in FIG. 2 superimposes a superimposing image signal SD2 output by the second resolution converter 120 onto a reference image signal SD1 output by the first resolution converter 118 to generate an overlay image signal OVD. FIG. 6 is a block diagram showing the internal structure of the OVL processor 130. The OVL processor 130 includes a write controller 220, a memory controller 222, a memory 224, a read controller 226, a picture quality controller 228, an onscreen display (OSD) controller 230, and another memory 232.

The reference image signal SD1 is written sequentially to the memory 224 by the write controller 220 through the memory controller 222. The superimposing image signal SD2 is temporarily stored in a buffer 220B provided in the write controller 220. When writing to an area of the memory 224 assigned to the superimposing image data, the data is then read from buffer 220B and written to the memory 224.

Image data stored in the memory 224 is read by the read controller 226 through the memory controller 222. The picture quality controller 228 adjusts picture quality (contrast, brightness, etc.) of the read image data. The adjusted image data is then synthesized by the OSD controller 230 with another image data, such as menu screens and the like ("OSD images" hereinafter), which are stored in the memory 232 and is output as the overlay image signal OVD. Where no OSD images are to be displayed, image data for OSD images is not synthesized.

Ordinary overlay circuits can be used for the OVL processor 130. For example, the PW364 of PIXEL WORKS (USA) can be used.

Images represented by the overlay image signals output by the OVL processor 130 are displayed on the liquid crystal display 20 (FIG. 1).

A3. Overlay Processing

FIGS. 7(A)–7(F) illustrate exemplary images written to the memory 224 of the OVL processor 130. In these examples, the computer display signal VPC(D) has a resolution of 800×600 pixels as shown in FIG. 7(A). The television image signal VS1(D) has a resolution of 320×240 pixels as shown in FIG. 7(B). The television image signal VS2(D) has a resolution of 320×240 pixels as shown in FIG. 7(C). In the selector 116 (FIG. 2), the computer display signal VPC(D) is selected as the reference original image signal SD10 and the television signal VS1(D) is selected as the superimposing original image signal SD20. The liquid crystal display 20 (FIG. 1) has a resolution of 1024×768 pixels. The image represented by the reference original image signal SD10 will be displayed full-screen on the liquid crystal display 20, while the image represented by the superimposing original image signal SD20 will be displayed superimposed over the reference image at a resolution of 640×480 pixels.

The image represented by the reference original image signal SD10 shown in FIG. 7(A) is subjected to resolution conversion by the first resolution converter 118 (FIG. 2) to make its resolution equal to that of the liquid crystal display 20, as shown in FIG. 7(D), and is output as the reference image signal SD1. Here, an 800×600 pixel image is enlarged to a 1024×768 pixel image.

The image represented by the superimposing original image signal SD20 shown in FIG. 7(B) is subjected to resolution conversion by the second resolution converter 120 (FIG. 2) as shown in FIG. 7(E), and is output as the superimposing image signal SD2. Here, a 320×240 pixel image is enlarged to a 640×480 pixel image.

As described before, the reference image signal SD1 is written into the memory 224 by the write controller 220 of the OVL processor 130. The superimposing image signal SD2 is also stored in an pre-assigned area in the memory 224. FIG. 7(F) shows the image signal stored in the memory 224 where the superimposing image signal SD2 is superimposed on the reference image signal SD1.

Accordingly, when the image signal stored in the memory 224 is sequentially read out and supplied to the liquid crystal panel 20, the overlay image is displayed where a relatively small image represented by the superimposed signal SD2 is superimposed on the full-screen reference image represented by the reference image signal SD1.

Figure 8A:
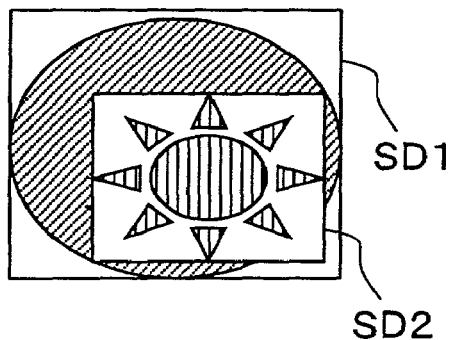
FIGS. 8(A)–8(F) show overlay displays composed of two images superimposed in six different orders of superimposition.
Figure 8B:
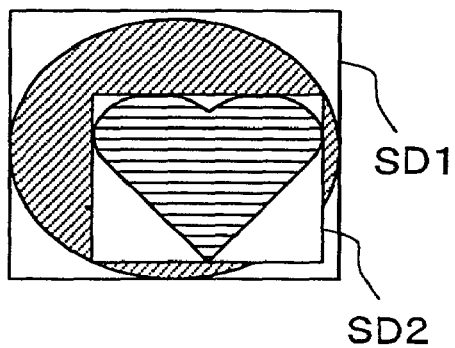
Figure 8C:
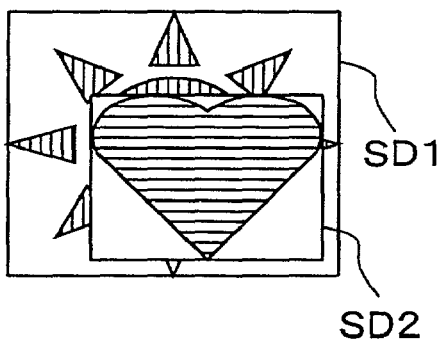
Figure 8D:
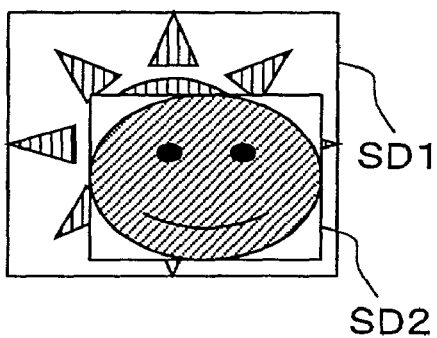
Figure 8E:
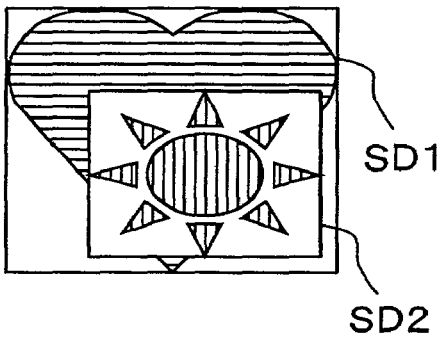
Figure 8F:
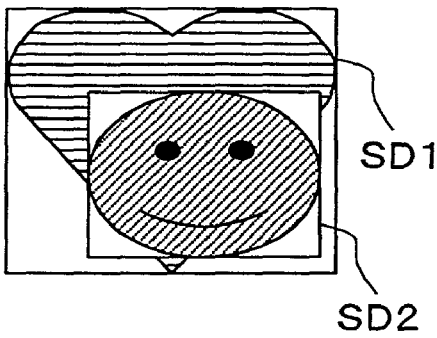

In the overlay image processor 10, the reference image signal and the superimposing image signal can be selected arbitrarily by the selector 116 from among three input signals, whereby six different overlay displays are possible, as shown in FIGS. 8(A)–8(F). In FIG. 8(A), the computer display signal VPC is used as the reference image signal SD1 and the first television signal VS1 is used as the superimposing image signal SD2, so that a small image represented by the first television signal VS1 is superimposed over the full-screen image represented by the computer display signal VPC. In FIG. 8(B), the second television signal VS2 is superimposed over the computer display signal VPC. In FIG. 8(C), the second television signal VS2 is superimposed over the first television signal VS1. In FIG. 8(D), the computer signal VPC is superimposed over the first television signal VS1. In FIG. 8(E), the first television signal VS1 is superimposed over the second television signal VS2. In FIG. 8(F), the computer signal VPC is superimposed over the second television signal VS2.

The image display device of the embodiment described hereinabove arbitrarily selects one reference image signal from among three input image signals, and selects one of the remaining two image signals as a superimposing image signal, whereby a relatively small image represented by the selected superimposing image signal is displayed superimposed over a full-screen image represented by the selected reference signal.

In the present embodiment, the reference image signal and superimposing image signal are selected from among three image signals, but they may be selected from among four or more image signals.

The input image signals may consist of television signals exclusively or computer display signals exclusively. That is, the invention may be implemented with various image signal combinations. In the present embodiment, the input image signals are analog, but digital image signal input could be implemented as well. In this case, the device will be provided with suitable decoders for the image inputs.

The overlay image processor 10 (FIG. 2) has two digital decoders 112, 114 for two television signals VS1(A) and VS2(A). As an alternative to this arrangement, the overlay image processor 10 may be provided with an analog switch for selecting one of the television signals VS1(A) and VS2(A) and a digital decoder for the selected television signal.

B. Second Embodiment

Figure 9:
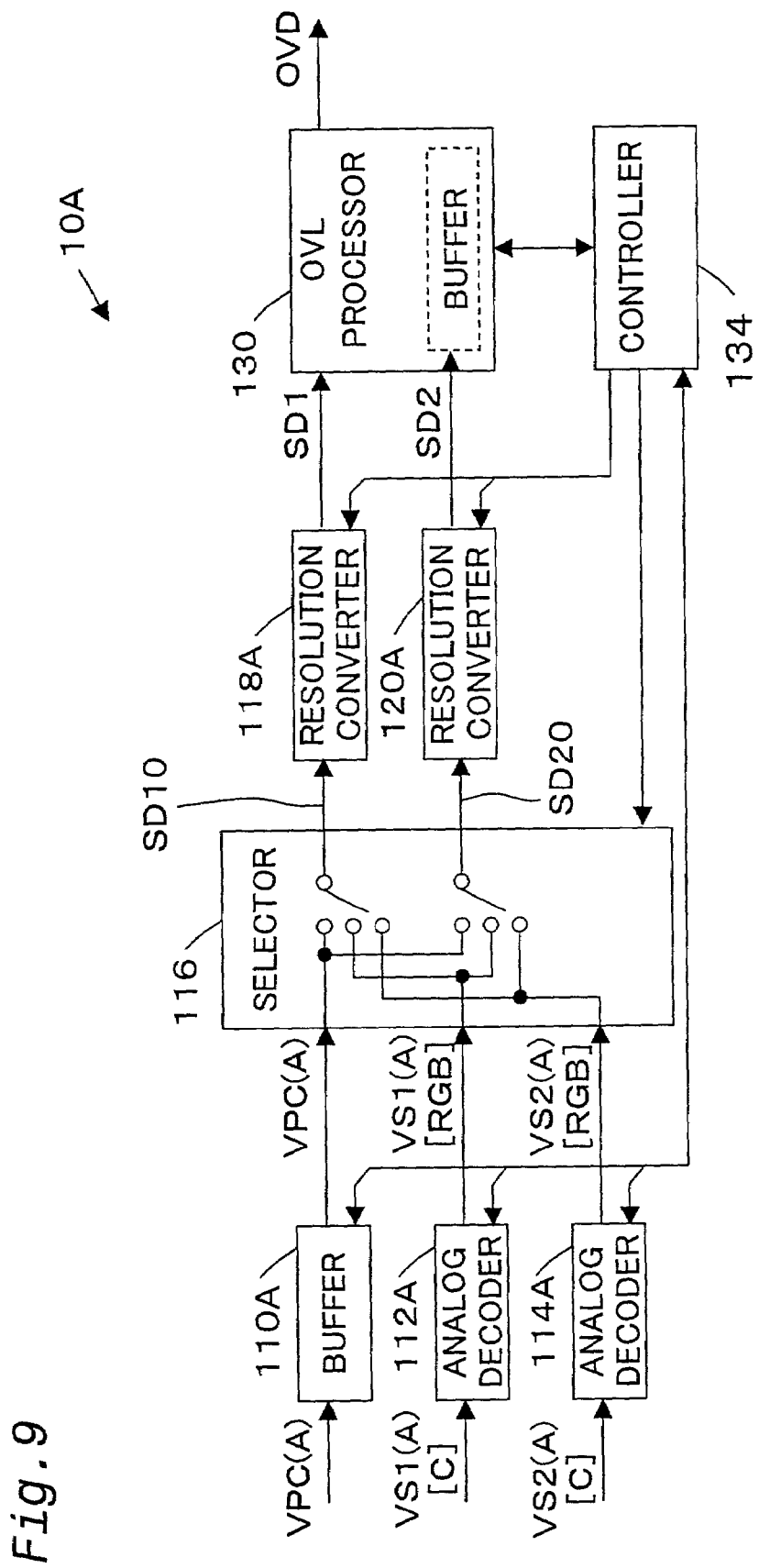
FIG. 9 is a block diagram showing the internal structure of an overlay image processor 10A constituting the overlay image processing device pertaining to a second embodiment.

FIG. 9 is a block diagram showing the internal structure of an overlay image processor 10A pertaining to a second embodiment of the invention. In the overlay image processor 10A, the first digital decoder 110 of the first embodiment (FIG. 2) is replaced by a buffer 10A, the second and third digital decoders 112, 114 by first and second analog decoders 112A, 114A, and the two resolution converters 118, 120 by two resolution converters 118A, 120A.

A computer display signal VPC(A) is temporarily stored in the buffer 110A and then supplied to the selector 116. The first and second analog decoders 112A, 114A convert the signal format of the television signals VS1(A), VS2(A) from an analog composite signal to an analog RGB signal and sync signals including horizontal and vertical sync signals. Various ICs available on the market may be used for the analog decoders. For example, the TDA9321 of Philips may be used.

Figure 10:
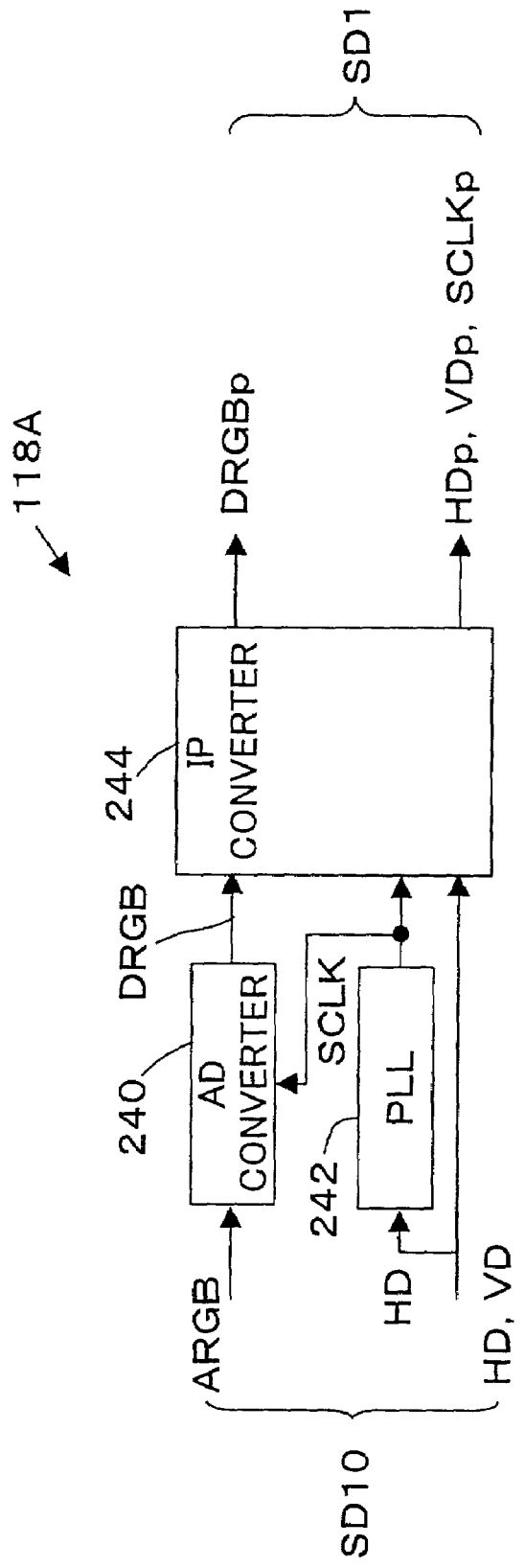
FIG. 10 is a block diagram showing the internal structure of the first resolution converter 118A.

FIG. 10 is a block diagram showing the internal structure of the first resolution converter 118A. The first resolution converter 118A includes an AD converter 240, a PLL circuit 242, and an IP converter 244. The reference original image signal SD10 selected by the selector 116 contains an analog RGB signal ARGB (ARGBpc, ARGBvs1, or ARGBvs2), horizontal sync signal HD (HDpc, HDvs1, or HDvs2), and vertical sync signal VD (VDpc, VDvs1, or VDvs2). The PLL circuit 242 generates a clock signal SCLK synchronized with the horizontal sync signal HD and corresponding to a pixel clock for the RGB signal ARGB. The AD converter 240 quantizes the analog RGB signal ARGB in synchronism with the clock signal SCLK to convert it to a digital RGB signal DRGB. A single image signal element quantized by the AD converter 240 corresponds to one pixel of the image represented by the RGB signal. Accordingly, by changing the frequency of the clock signal SCLK generated by the PLL circuit 242 it is possible to change the number of pixels in the image represented by the quantized RGB signal, that is, the resolution. Like the IP converter 216 of resolution converter 118 (FIG. 5) in the first embodiment, the IP converter 244 converts interlaced reference original image signals SD10 into noninterlaced (progressive) image signals.

In this way, the first resolution converter 118A converts the analog RGB signal ARGB contained in the reference original image signal SD10 into a digital RGB signal DRGB, and converts the resolution of the RGB signal. The second resolution converter 120A is analogous.

Like the overlay image processor 10 of the first embodiment, the overlay image processor 10A of the second embodiment depicted in FIG. 9 arbitrarily selects one reference original image signal from among three input image signals, and then arbitrarily selects one of the remaining two input image signals as a superimposing original image signal. The selected superimposing image signal is then superimposed over the selected reference image signal to generate an overlay image signal. Thus, by implementing this overlay image processor 10A in an image display device it becomes possible to display overlay images wherein the reference image has been selected arbitrarily. The various modifications described in the first embodiment are possible with the present embodiment as well.

The overlay image processor 10A of the present embodiment has two analog decoders 112A, 114A for the television signals VS1(A) and VS2(A). As an alternative to this arrangement, the overlay image processor 10A may be provided with an analog switch for selecting one of the television signals VS1(A) and VS2(A) and an analog decoder for the selected television signal.

C. Third Embodiment

Figure 11:
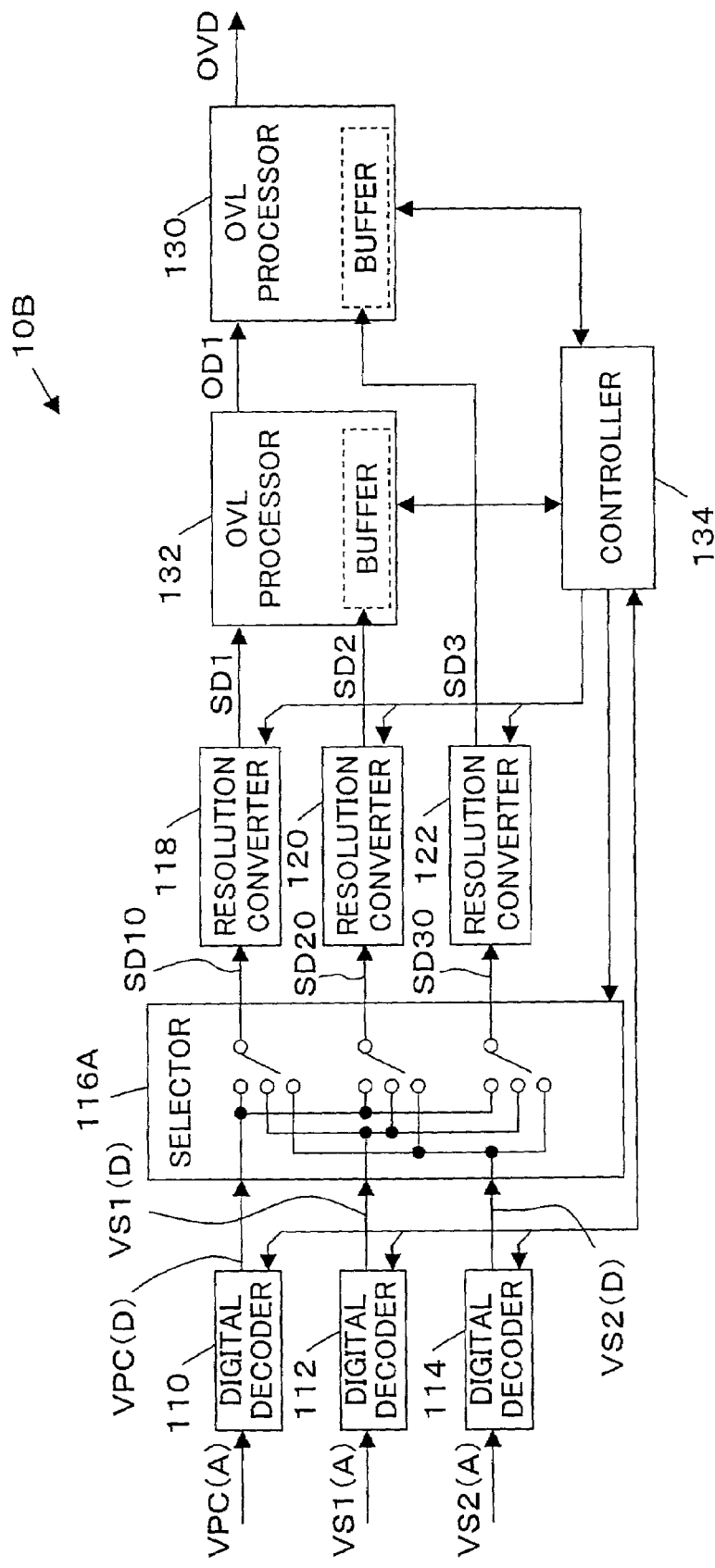
FIG. 11 is a block diagram showing the internal structure of an overlay image processor 10B constituting the overlay image processing device pertaining to a third embodiment.

FIG. 11 is a block diagram showing the internal structure of an overlay image processor 10B pertaining to a third embodiment of the invention. In the overlay image processor 10B, the 3-input, 2-output selector 116 of the first embodiment (FIG. 2) is replaced by a 3-input, 3-output selector 116A. The selector 116A selects one reference image signal SD10, and two superimposing image signals SD20 and SD30 from among three image signals VPC(D), VS1(D), and VS2(D).

The configuration of the overlay image processor 10B is the same as that of the overlay image processor 10 of the first embodiment (FIG. 2) except for an additional resolution converter 122 and an additional OVL processor 132. The resolution converter 122 converts the resolution of the second superimposing image signal SD30. This resolution converter 122 is identical to the other resolution converters 118, 120, and outputs a second superimposing image signal SD3 having a converted resolution.

The two OVL processor 132, 130 implements two-stage image overlay. The first stage OVL processor 132 receives the reference image signal SD1 and first superimposing image signal SD2 to produce a first overlay image signal OD1 where the first superimposing image signal SD2 is superimposed on the reference image signal SD1. The first stage OVL processor 132 has the same configuration as that of the OVL processor 130 shown in FIG. 6 except that the picture quality controller 228, OSD controller 230, and memory 232 are omitted. Alternatively, the first stage OVL processor 132 may have the same configuration as that shown in FIG. 6. The second stage OVL processor 130 receives the first overlay image signal OD1 and the second superimposing image signal SD3 to produce a second overlay image signal OD2 where the second superimposing image signal SD3 is superimposed on the first overlay image signal OD1.

Figure 12A:
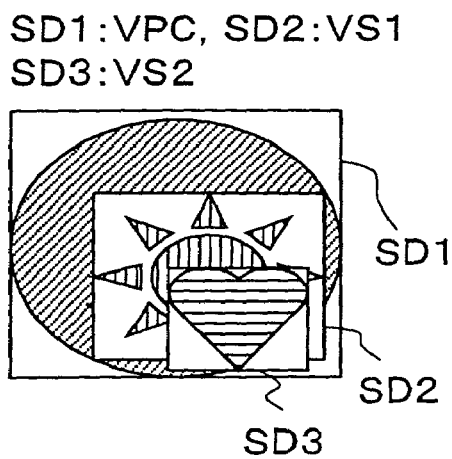
FIGS. 12(A)–12(F) show overlay displays composed of three images superimposed in six different orders of superimposition.
Figure 12B:
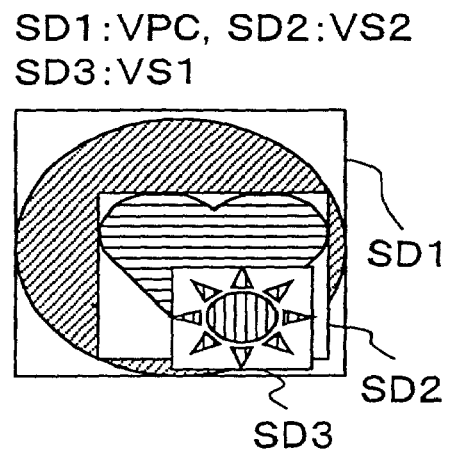
Figure 12C:
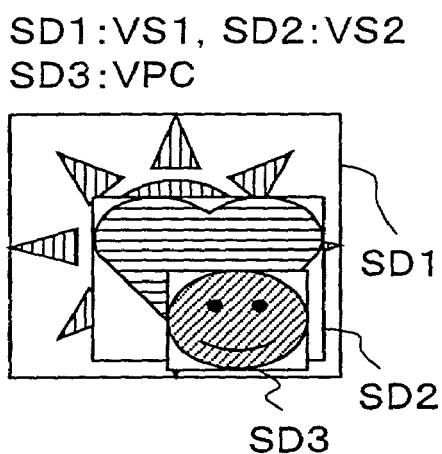
Figure 12D:
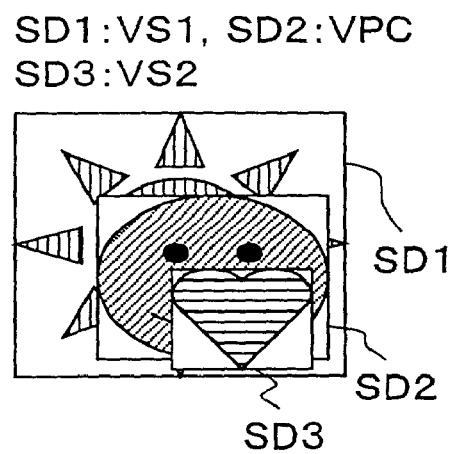
Figure 12E:
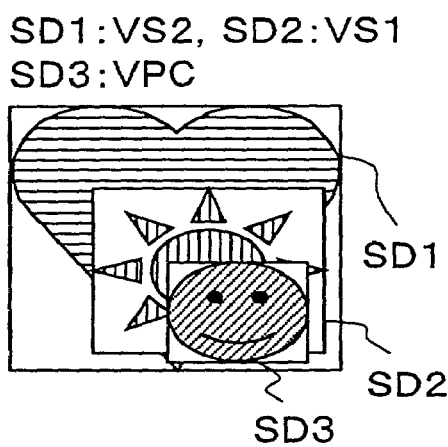
Figure 12F:
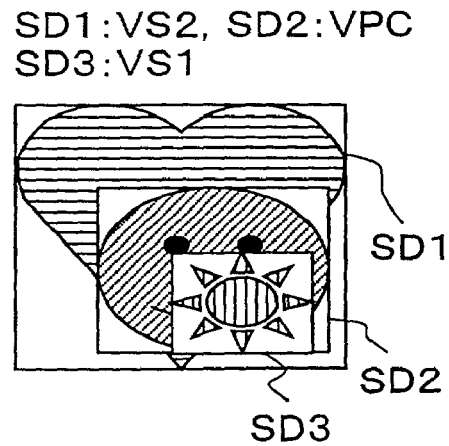

In the overlay image processor 10B of the present embodiment, the reference image signal and superimposing image signals can be selected arbitrarily by the selector 116 from among three input image signals, whereby three images can be displayed overlaid in an arbitrary order of preference. Specifically, three images can be displayed overlaid in six different orders of superimposition (in the order of reference image SD1, first superimposed image SD2, and second superimposed image SD3), as shown in FIGS. 12(A)–12(F). In FIG. 12(A), the order of superimposition is computer display signal VPC, first television signal VS1, second television signal VS2; in FIG. 12(B), the order of superimposition is computer display signal VPC, second television signal VS2, first television signal VS1. In FIG. 12(C), the order of superimposition is first television signal VS1, second television signal VS2, computer display signal VPC; and in FIG. 12(D), the order of superimposition is first television signal VS1, computer display signal VPC, second television signal VS2. In FIG. 12(E), the order of superimposition is second television signal VS2, first television signal VS1, computer display signal VPC; and in FIG. 12(F), the order of superimposition is second television signal VS2, computer display signal VPC, first television signal VS1.

Like the overlay image processor 10 of the first embodiment, the overlay image processor 10B of the second embodiment can arbitrarily select a single reference image signal from among three image signals, and arbitrarily select the remaining two image signals as superimposing image signals. The two selected superimposing image signals can then be superimposed in an arbitrary order of preference over the selected reference image signal to generate an overlay image signal. That is, an overlay image signal composed of three image signals superimposed according to an arbitrary order of superimposition can be generated. By implementing this overlay image processor 10B in an image display device it becomes possible to display overlay images in which images represented by three different image signals are superimposed according to an arbitrary order of superimposition.

In the present embodiment, three input image signals are superimposed according to an arbitrary order of superimposition, but it would be possible to superimpose four or more image signals according to an arbitrary order of superimposition. In yet another arrangement, it would be possible to select three image signals from among four or more image signals and to superimpose these three image signals according to an arbitrary order of superimposition. That is, one image signal from among an m number (where m is an integer more than 2) of image signals is selected as a reference image signal and an (n−1) number (where n is an integer more than 1) of image signals are selected as superimposing image signals, and these n number of image signals are superimposed in an arbitrary order of superimposition. In this way, it is possible to select an arbitrary number n of image signals from among an m number of input signals and to superimpose the selected n number of image signals in an arbitrary order of superimposition.

D. Fourth Embodiment

Figure 13:
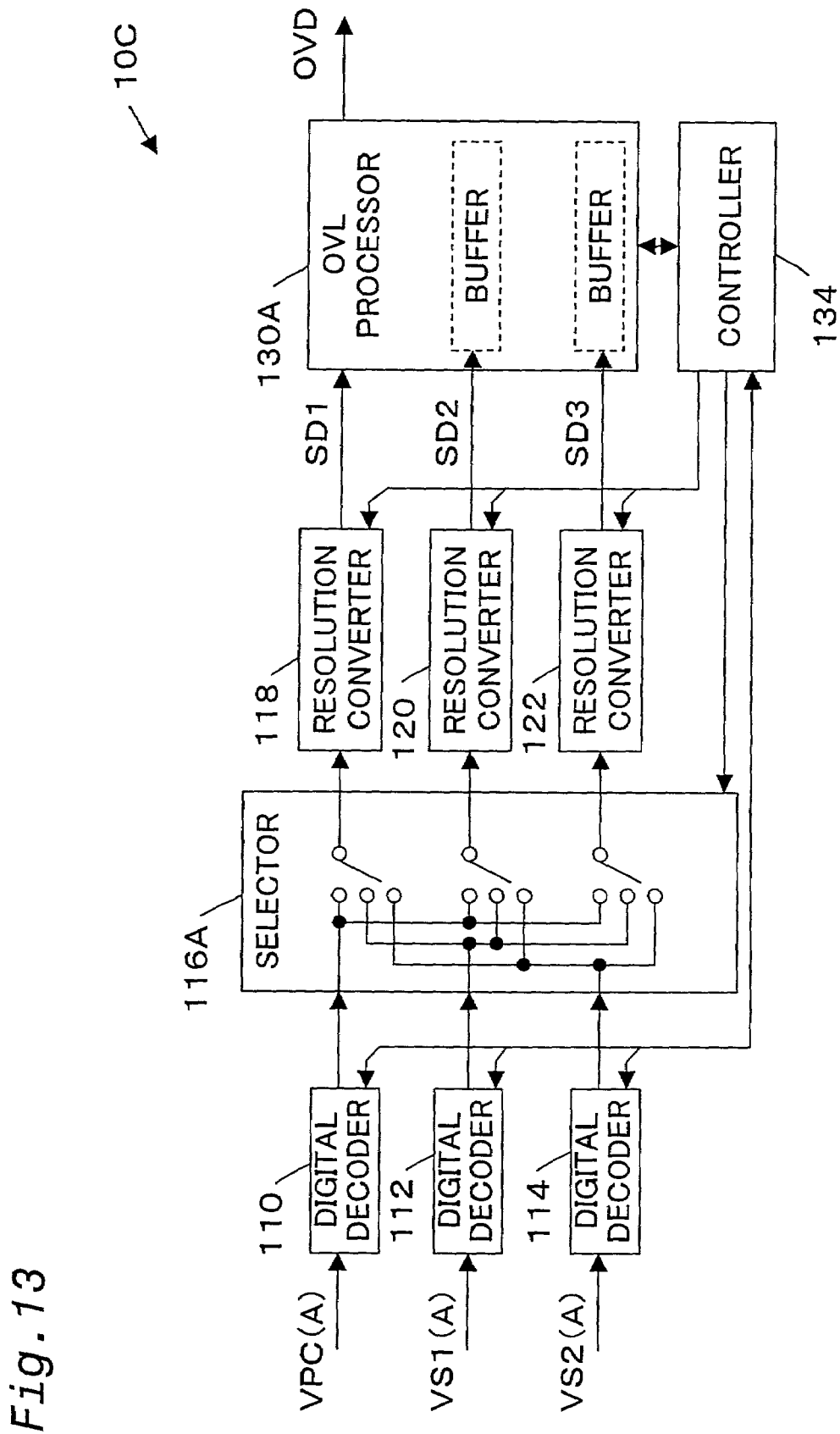
FIG. 13 is a block diagram showing the internal structure of an overlay image processor 10C constituting the overlay image processing device pertaining to a fourth embodiment

FIG. 13 is a block diagram showing the internal structure of an overlay image processor 10C pertaining to a fourth embodiment of the invention. The overlay image processor 10C has the same structure as that of the overlay image processor 10B (FIG. 1) except that the two 2-input OVL processors 130, 132 in the third embodiment (FIG. 11) are replaced with a single 3-input OVL processor 130A.

The OVL processor 130A superimposes three input image signals in an order of reference image signal SD1, first superimposing image signal SD2, and second superimposing image signal SD3.

Like the overlay image processor 10B of the third embodiment, the overlay image processor 10C of the present embodiment can superimpose three image signals in an arbitrary order of superimposition to generate an overlay image signal OVD. By implementing this overlay image processor 10C in an image display device it becomes possible to display overlay images in which images represented by three different image signals are superimposed according to an arbitrary order of superimposition.

In the present embodiment, however, a dedicated OVL processor accepting a number of inputs corresponding to the number of image signals for superimposition is required. In the third embodiment, on the other hand, an OVL processor for superimposing a plurality of image signals can be constructed using a plurality of 2-input OVL processors. As noted, commercially available circuits can be used as 2-input OVL processors, and thus the third embodiment offers easier construction of an overlay image process processor than does the fourth embodiment.

E. Modifications

E1. First Modification

In the preceding embodiments the inputs are analog image signals, but the invention may be practiced with digital image signal input as well.

E2. Second Modification

In the preceding embodiments, implementation of the image processing device of the invention in an image display device using a liquid crystal panel was described, but this is not limiting. The invention may be put into practice with display device using plasma displays or other types of flat panels.

E3. Third Modification

In the first, third and fourth embodiments, the overlay image processors 10, 10B, and 10C are provided with decoders consisting exclusively of digital decoders 110, 112, and 114. Similarly, the overlay image processor 10A of the second embodiment is provided with decoders consisting exclusively of analog decoders 112A and 114A. In an alternative arrangement, the displays shown in FIG. 8 and FIG. 12 may be produced providing overlay image processor 10, 10A, 10B, or 10C with a combination of digital decoders and analog decoders.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An overlay image processing device for generating an overlay image signal composed of an n number of selected image signals, n being an integer greater than 2, the overlay image processing device comprising:

a plurality of digital decoders configured to digitally decode a plurality of image signals;

an image selector configured to directly receive outputs from each of the plurality of digital decoders and configured to select from among the plurality of digitally decoded image signals one (1) reference image signal and (n−1) number of superimposing image signals;

a plurality of resolution converters configured to directly receive the selected image signals output from the image selector, such that each resolution converter can input any of the respective outputs, to convert resolutions of the n number of selected image signals into respective adjustable desired resolutions, and to output the converted image signals to an image synthesizer, wherein the image synthesizer is configured to superimpose the (n−1) number of converted superimposing image signals on the converted one (1) reference signal, and the image selector is configured to connect each of the digital decoders to any of the resolution converters.

2. An overlay image processing device according to claim 1 wherein at least one of the plurality of image signals is a display signal output from a personal computer.

3. An overlay image processing device according to claim 1 wherein the image selector selects the reference image signal and the (n−1) number of superimposing image signals according to an arbitrary predetermined order of superposition for the n number of image signals; and the image synthesizer superimposes the (n−1) number of converted superimposing image signals on the converted reference image signal according to the order of superposition.

4. An overlay image processing device according to claim 1 further comprising a scan converter configured to convert at least one of the interlaced image signals selected by the image selector into a non-interlaced image signal when the at least one of the image signals selected by the image selector is an interlaced image signal.

5. An overlay image processing device according to claim 1 wherein the image synthesizer has the n number of 2-input image synthesizers, each 2-input image synthesizer being configured to receive upper-side and lower-side image signals and superimpose the upper-side image signal on the lower-side image signal;

the n number of 2-input image synthesizers being connected in series in multistage fashion such that the 2-input image synthesizer of a first stage uses the reference image signal as the lower-side image signal and a first superimposing image signal as the upper-side image signal, while the 2-input image synthesizer of an $i^{th}$ stage, where i is between 2 and n, inclusive, uses an output of the 2-input image synthesizer of an $(i-1)^{th}$ stage as the lower-side image signal and an $i^{th}$ superimposing image signal as the upper-side image signal.

6. An overlay image display device for displaying an overlay image composed of an n number of selected images, n being an integer greater than 2, the overlay image display device comprising:

an overlay image processing device for generating an overlay image signal composed of then number of superimposed image signals; and an image display device for displaying an image represented by the overlay image signal;

wherein the overlay image processing device includes:

a plurality of digital decoders configured to digitally decode a plurality of image signals;

an image selector configured to directly receive outputs from each of the plurality of digital decoders and configured to select from among the plurality of digitally decoded image signals one (1) reference image signal and (n−1) number of superimposing image signals;
a plurality of resolution converters configured to directly receive the selected image signals output from the image selector, such that each resolution converter can input any of the respective outputs, to convert resolutions of the n number of selected image signals into respective adjustable desired resolutions, and to output the converted signals to an image synthesizer,
wherein the image synthesizer is configured to superimpose the (n−1) number of converted superimposing image signals on the converted one (1) reference signal, and
the image selector is configured to connect each of the digital decoders to any of the resolution converters.

7. An overlay image display device according to claim 6 wherein at least one of the m number of image signals is a display signal output from a personal computer.

8. An overlay image display device according to claim 6 wherein the image selector selects the reference image signal and the (n−1) number of superimposing image signals according to an arbitrary predetermined order of superposition for the n number of image signals; and
the image synthesizer superimposes the (n−1) number of converted superimposing image signals on the converted reference image signal according to the order of superposition.

9. An overlay image display device according to claim 6 further comprising a scan converter configured to convert at least one of the image signals selected by the image selector into a non-interlaced image signal when the at least one of the image signals selected by the image selector is an interlaced image signal.

10. An overlay image display device according to claim 6 wherein the image synthesizer has the n number of 2-input image synthesizers, each 2-input image synthesizer being configured to receive upper-side and lower-side image signals and superimpose the upper-side image signal on the lower-side image signal;
the n number of 2-input image synthesizers being connected in series in multistage fashion such that the 2-input image synthesizer of a first stage uses the reference image signal as the lower-side image signal and a first superimposing image signal as the upper-side image signal, while the 2-input image synthesizer of an $i^{th}$ stage, where i is between 2 and n, inclusive, uses an output of the 2-input image synthesizer of an $(i-1)^{th}$ stage as the lower-side image signal and an $i^{th}$ superimposing image signal as the upper-side image signal.

11. An overlay image processing device according to claim 6,
wherein the respective outputs of the image selector include an analog RGB signal and a horizontal sync signal,
wherein each of the resolution converters generates a clock signal synchronized with the horizontal sync signal and corresponding to a pixel clock for the analog RGB signal, and quantizes the RGB signal in synchronism with the clock signal to convert the analog RGB signal to a digital RGB signal, and
wherein a single image signal element quantized by each of the resolution converters corresponds to one pixel of the image represented by the RGB signal.

12. A method of generating an overlay image signal composed of an n number of superimposed image signals, n being an integer greater than 2, the method comprising the steps of:
(a) digitally decoding a plurality of image signals by use of a plurality of respective digital decoders;
(b) directly inputting outputs from each of the plurality of digital decoders to an image selector;
(c) selecting from among the plurality of digitally decoded image signals, by use of the image selector, one (1) reference image signal and (n−1) number of superimposing image signals;
(d) converting resolutions of the n number of selected image signals received directly from the image selector, including the reference image signal and the (n−1) number of superimposing image signals, into respective adjustable desired resolutions by use of a plurality of resolution converters directly receiving respective outputs of the image selector, such that any resolution converter can receive any output of the image selector; and
(e) superimposing the (n−1) number of converted superimposing image signals on the converted reference signal, wherein an output of step (d) is output to step (e), and each of the digital decoders can be connected to any of the resolution converters via the image selector.

13. A method according to claim 12 wherein at least one of the plurality of image signals is a display signal output from a personal computer.

14. A method according to claim 12 wherein the step (c) includes selecting the reference image signal and the (n−1) number of superimposing image signals according to an arbitrary predetermined order of superposition for the n number of image signals; and
the step (e) includes superimposing the (n−1) number of converted superimposing image signals on the converted reference image signal according to the order of superposition.

15. A method according to claim 12 further comprising converting at least one of the image signals selected by the image selector into a non-interlaced image signal when the at least one of the image signals selected by the image selector is an interlaced image signal.

16. A method according to claim 12 wherein the step (e) includes the n number of 2-input image synthesizing steps, each 2-input image synthesizing step including receiving upper-side and lower-side image signals and superimposing an upper-side image signal on a lower-side image signal;
the n number of 2-input image synthesizing steps being performed in series in multistage fashion such that the 2-input image synthesizing step of a first stage uses the reference image signal as the lower-side image signal and a first superimposing image signal as the upper-side image signal, while the 2-input image synthesizing step of an $i^{th}$ stage, where i is between 2 and n, inclusive, uses an output of the 2-input image synthesizing step of an $(i-1)^{th}$ stage as the lower-side image signal and an $i^{th}$ supenmposing image signal as the upper-side image signal.

17. A method of generating an overly image signal according to claim 12, wherein the step (d) of converting resolutions further includes the steps of:
(i) inputting an analog RGB signal and a horizontal sync signal;

(ii) outputting a clock signal that is synchronized with the horizontal sync signal and corresponds to a pixel clock for the analog RGB signal;

(iii) converting the analog RGB signal to a digital RGB signal by quantizing the analog RGB signal in synchronism with the clock signal; and (iv) changing the resolution of the image represented by the quantized RGB signal by changing the frequency of the clock signal.

18. An overlay image processing device for generating an overlay image signal composed of an n number of selected image signals, n being an integer greater than 2, the overlay image processing device comprising:

an image selector configured to select, from among a plurality of image signals received directly from a plurality of respective digital decoders, one (1) reference image signal and (n−11) number of superimposing image signals;

a plurality of resolution converters configured to directly receive the selected image signals output from the image selector, such that each resolution converter can input any of the respective outputs, to convert resolutions of the n number of selected image signals into respective adjustable desired resolutions, and to output the converted image signals to an image synthesizer, wherein the image synthesizer is configured to superimpose the (n−11) number of converted superimposing image signals on the converted one (1) reference signal, the image synthesizer includes first and second overlay processors connected in series, the first overlay processor is configured to receive an output from a subset of the plurality of resolution converters, and the second overlay processor is configured to directly receive an output from the first overlay processor and another of the plurality of resolution converters, and the image selector is configured to connect each of the digital decoders to any of the resolution converters.

19. An overlay image processing device according to claim 18 wherein at least one of the plurality of image signals is a display signal output from a personal computer.

20. An overlay image processing device according to claim 18 wherein the image selector selects the reference image signal and the (n−1) number of superimposing image signals according to an arbitrary predetermined order of superposition for the n number of image signals; and the image synthesizer superimposes the (n−1) number of converted superimposing image signals on the converted reference image signal according to the order of superposition.

21. An overlay image processing device according to claim 18 further comprising a scan converter configured to convert at least one of the interlaced image signals selected by the image selector into a non-interlaced image signal when the at least one of the image signals selected by the image selector is an interlaced image signal.

22. An overlay image processing device according to claim 18, wherein the respective outputs of the image selector include an analog RGB signal and a horizontal sync signal, wherein each of the resolution converters generates a clock signal synchronized with the horizontal sync signal and corresponding to a pixel clock for the analog RGB signal and quantizes the RGB signal in synchronism with the clock signal to convert the analog RGB signal to a digital RGB signal, and wherein a single image signal element quantized by each of the resolution converters corresponds to one pixel of the image represented by the RGB signal.

23. A method of generating an overlay image signal composed of an n number of selected image signals, n being an integer greater than 2, the method comprising the steps of:

(a) inputting a plurality of image signals directly from a plurality of respective digital decoders to an image selector and selecting one (1) reference image signal and (n−1) number of superimposing image signals from among the plurality of image signals;

(b) converting resolutions of the n number of selected image signals, including the reference image signal and the (n−1) number of superimposing image signals, into respective adjustable desired resolutions by use of a plurality of resolution converters directly inputting respective outputs of the image selector, such that any resolution converter can receive any output of the image selector;

(c) first superimposing the (n−1) number of converted superimposing image signals on the converted reference signal, the first superimposing receiving an output from a subset of a plurality of steps (b); and (d) second superimposing a directly received output form the first overlay processor and another output of the plurality of steps (b), wherein an output of step (b) is output to step (d), and each of the digital decoders can be connected to any of the resolution converters via the image selector.

24. A method according to claim 23 wherein at least one of the plurality of image signals is a display signal output from a personal computer.

25. A method according to claim 23 wherein the step (a) includes selecting the reference image signal and the (n−1) number of superimposing image signals according to an arbitrary predetermined order of superposition for the n number of image signals; and the steps (c) and (d) include superimposing the (n−1) number of converted superimposing image signals on the converted reference image signal according to the order of superposition.

26. A method according to claim 23 further comprising converting at least one of the image signals selected by step (a) into a non-interlaced image signal when the at least one of the image signals selected by step (a) is an interlaced image signal.

27. A method of generating an overly image signal according to claim 23, wherein the step (b) of converting resolutions further includes the steps of:

(i) inputting an analog RGB signal and a horizontal sync signal;

(ii) outputting a clock signal that is synchronized with the horizontal sync signal and corresponds to a pixel clock for the analog RGB signal;

(iii) converting the analog RGB signal to a digital RGB signal by quantizing the analog RGB signal in synchronism with the clock signal; and (iv) changing the resolution of the image represented by the quantized RGB signal by changing the frequency of the clock signal.

* * * * *